(12) United States Patent
Kazuo

(10) Patent No.: US 11,555,979 B2
(45) Date of Patent: Jan. 17, 2023

(54) LENS DRIVING DEVICE

(71) Applicant: AAC Optics Solutions Pte. Ltd., Singapore (SG)

(72) Inventor: Shikama Kazuo, Osaka (JP)

(73) Assignee: AAC Optics Solutions Pte. Ltd., Singapore (SG)

(*) Notice: Subject to any disclaimer, the term of this patent is extended or adjusted under 35 U.S.C. 154(b) by 0 days.

(21) Appl. No.: 16/726,975

(22) Filed: Dec. 26, 2019

(65) Prior Publication Data

US 2020/0409023 A1 Dec. 31, 2020

(30) Foreign Application Priority Data

Jun. 28, 2019 (JP) .............................. JP2019-120631

(51) Int. Cl.
| | | |
|---|---|---|
| *G02B 7/02* | (2021.01) | |
| *H04N 5/225* | (2006.01) | |
| *H04N 5/232* | (2006.01) | |

(52) U.S. Cl.
CPC ............. *G02B 7/026* (2013.01); *G02B 7/023* (2013.01); *H04N 5/2253* (2013.01); *H04N 5/23287* (2013.01); *H04N 5/2257* (2013.01)

(58) Field of Classification Search
CPC ..................... G02B 27/646; G03B 5/00; G03B 2205/0015; G03B 2205/0069
See application file for complete search history.

(56) References Cited

U.S. PATENT DOCUMENTS

| | | | | | |
|---|---|---|---|---|---|
| 2011/0134303 | A1* | 6/2011 | Jung | .................... | H04N 5/2257 348/340 |
| 2014/0362284 | A1* | 12/2014 | Shin | .................... | G02B 27/646 348/373 |
| 2015/0015769 | A1* | 1/2015 | Lin | .................... | H04N 5/247 348/345 |
| 2016/0085086 | A1* | 3/2016 | Rho | .................... | H04N 5/23264 348/208.99 |
| 2016/0377881 | A1* | 12/2016 | Jung | .................... | H02K 41/0356 359/824 |

FOREIGN PATENT DOCUMENTS

| | | |
|---|---|---|
| JP | 2017037306 A1 | 2/2017 |
| KR | 101682178 B1 | 12/2016 |
| WO | 2015104908 A1 | 7/2015 |

* cited by examiner

*Primary Examiner* — Noam Reisner
(74) *Attorney, Agent, or Firm* — W&G Law Group

(57) ABSTRACT

A lens driving device which is small in size and good in focus adjustment and hand-shake correction disclosed, including: a housing, including a fixing base having a circuit substrate and a cover forming a receiving space; a spring piece connecting a lens module and a supporting frame; a supporting component for supporting the supporting frame and a second supporting frame in the housing; a first magnet steel, mounted and fixed on the supporting frame; a first drive coil, mounted on the lens module to enable a movement in an optical axis direction under an electromagnetic action; and a second drive coil, disposed on the fixing bases, and oppositely disposed near a horizontal plane of a gravity center of the lens module above a second magnet steel so that the second magnet steel mounted on the supporting frame moves along a direction orthogonal to the optical axis under the electromagnetic action.

14 Claims, 4 Drawing Sheets

LENS DRIVING DEVICE

TECHNICAL FIELD

The present disclosure relates to the field of lens driving devices for cameras, and in particular to a lens driving device having an anti jitter function.

BACKGROUND

With the rapid development of photographic technology, lens driving devices are widely applied to numerous photographic devices. The lens driving devices may be applied to different portable electronic devices, such as mobile phones and tablet computers. In this way, the lens driving devices are acceptable especially for consumers.

A driving mechanism of a lens driving device applicable to a common portable electronic device is usually formed by a coil and a magnet steel, where the coil is fixed to an outer circumference of a camera lens frame. When a current is applied to the coil, the coil enables the camera lens frame to move along an optical axis direction of a lens under the action of an electromagnetic force, thereby achieving focusing. However, when a user takes a photograph while holding an electronic device with a hand, it is impossible to avoid a jitter of the lens driving device caused by a hand shake. Therefore, the lens, sometimes, will move continuously in a direction orthogonal to the optical axis of the lens. In this case, an impact caused by the hand shake cannot be avoided in the lens driving device, resulting in lowered quality of a photographed image.

In addition, in an ordinary hand-shake correction device, a drive noise is generated in a nearby camera sensor by a drive circuit of an electromagnetic driving device that is at the bottom of the lens driving device and disposed at a side of the camera sensor, or an image jitter is caused by rotation of a hand-shake correction component of the lens driving device. Further, it is required to drive a gravity center of a lens module at a high location away from the drive circuit. Therefore, a stronger force is required to correct the jitter in a direction orthogonal to the optical axis.

Thus, it is necessary to provide a new lens driving device for solving the above problem.

SUMMARY

Problem to be Solved

The present disclosure provides a new lens driving device. The lens driving device solves a problem that quality of a photographed image is lowered in a case that a lens continuously moves along a direction orthogonal to an optical axis of the lens due to a jitter of the lens driving device resulting from a jitter of an electronic device when a user takes a photograph.

Solution for Solving the Problem

The object of the present disclosure is achieved in the following manners. In addition, for convenience of understanding, symbols are used in accompanying drawings in the following descriptions. However, different constitutive elements of the present disclosure are not limited to these symbols, and those skilled in the art shall interpret the constitutive elements within a technically understandable scope in a broad sense.

A lens driving device has a receiving space formed by a fixing base and a housing. The receiving space includes a lens module, a spring piece; a supporting frame, a supporting component, a first electromagnetic driving device, which are used for driving the lens module to move freely along an optical axis direction; a supporting frame and a second electromagnetic driving device which are used for driving the supporting frame to move freely relative to the fixing base along a direction orthogonal to the optical axis direction. The second electromagnetic driving device is disposed on the fixing base and the supporting frame respectively, and also disposed near a horizontal plane of a gravity center of the lens module. The supporting frame is formed by two components which have different moving axes within a plane. In this way, the two components move relative to the fixing base.

Preferably, the supporting component is a ball, and at least 6 balls are disposed.

Preferably, each of the two supporting frames has a groove for driving the supporting frame to move along a different moving axis within the plane respectively.

Preferably, the first electromagnetic driving device and the second electromagnetic driving device utilize an electromagnetic action generated by a magnet steel and a coil.

Preferably, one of the two supporting frames is fixed with the magnet steel, and the other supporting frame has a groove for holding the supporting component up and down.

Preferably, the spring piece may also be used as a path for energizing a magnetic detecting element disposed opposite to an inner surface of the magnet steel.

Preferably, the second drive coil oppositely disposed above the magnet steel of the second electromagnetic driving device generate an electromagnetic action by clamping the magnet steel of the second electromagnetic driving device in the optical axis direction.

Preferably, the spring piece is further used as a path for energizing a blade driving device and the like combined on an upper surface of the lens module.

In addition, the present disclosure includes a photographing device such as a camera having the lens driving device.

In addition, the present disclosure includes a portable electronic device, such as a smart phone having the above lens driving device.

Effects of the Present Disclosure

The lens driving device of the present disclosure has advantages of performing movement adjustment and rotation limitation for the optical axis of the lens, thereby preventing the jitter and improving the quality of the photographed image.

SYMBOLS DESCRIPTION

Figure 1:
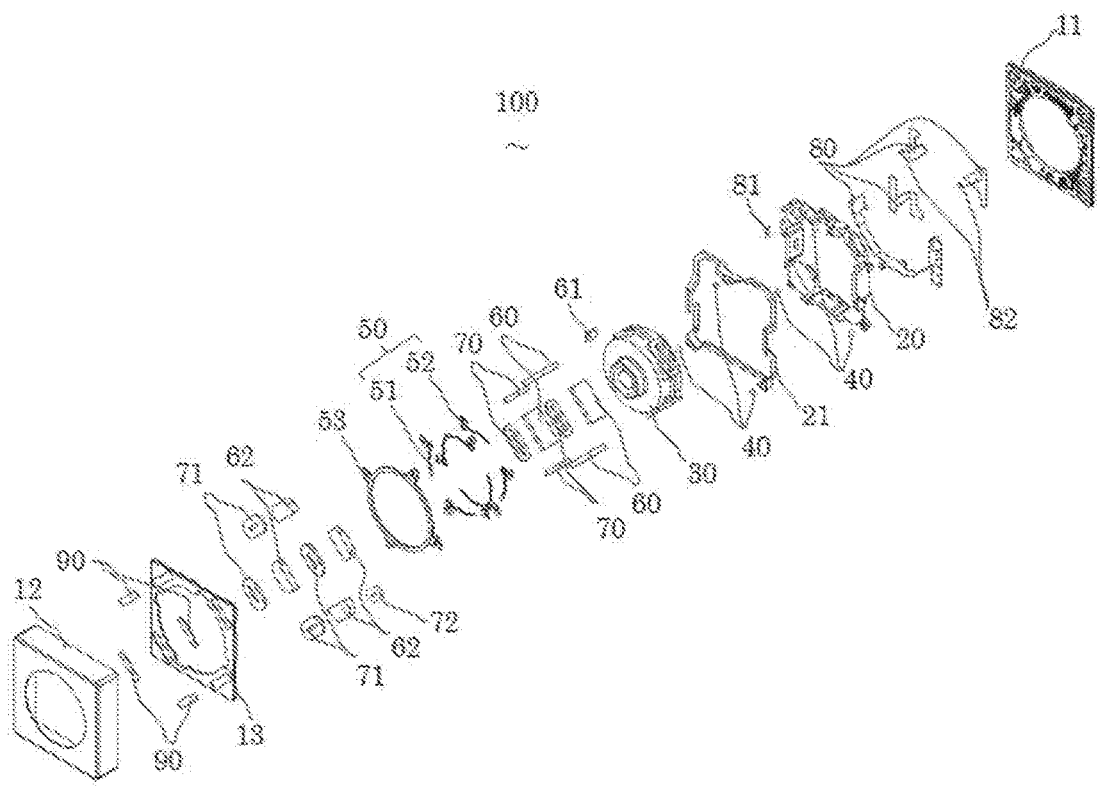
FIG. 1 is an exploded view illustrating a lens driving device according to an embodiment of the present disclosure.
Figure 2:
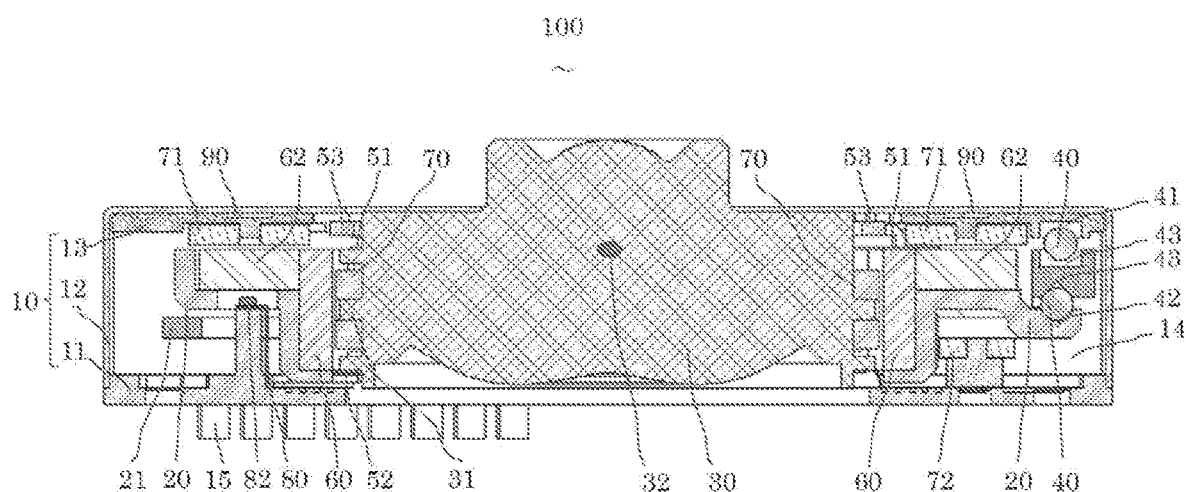
FIG. 2 is a sectional view illustrating a lens driving device according to an embodiment of the present disclosure.
Figure 3:
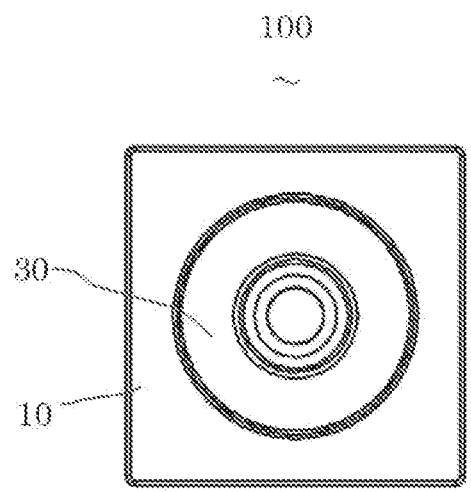
FIG. 3 is a front view illustrating a lens driving device according to an embodiment of the present disclosure.
Figure 4:
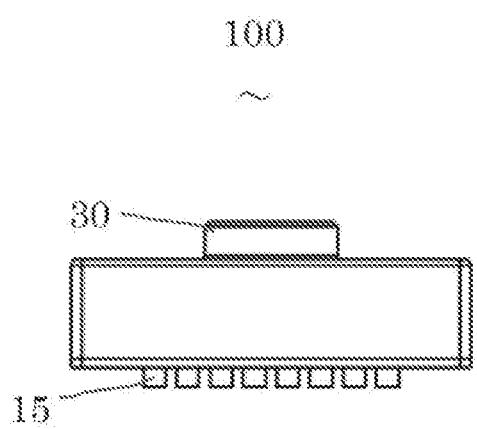
FIG. 4 is a left view illustrating a lens driving device according to an embodiment of the present disclosure.
Figure 5:
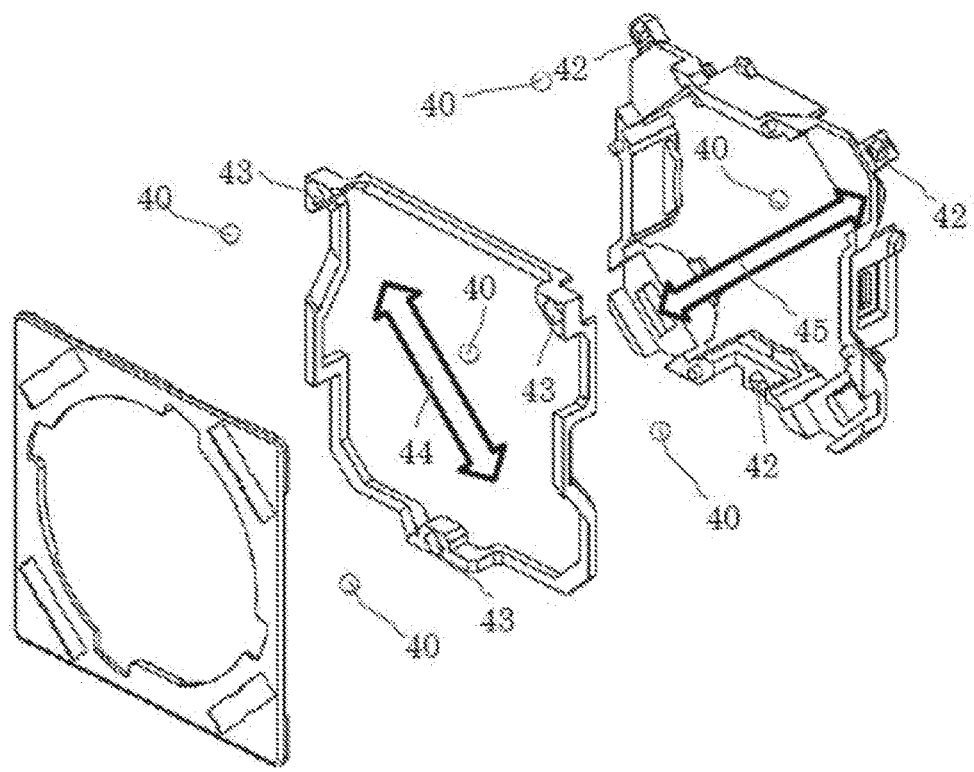
FIG. 5 is an exploded view 1 illustrating a fixing base and a supporting component according to an embodiment of the present disclosure.
Figure 6:
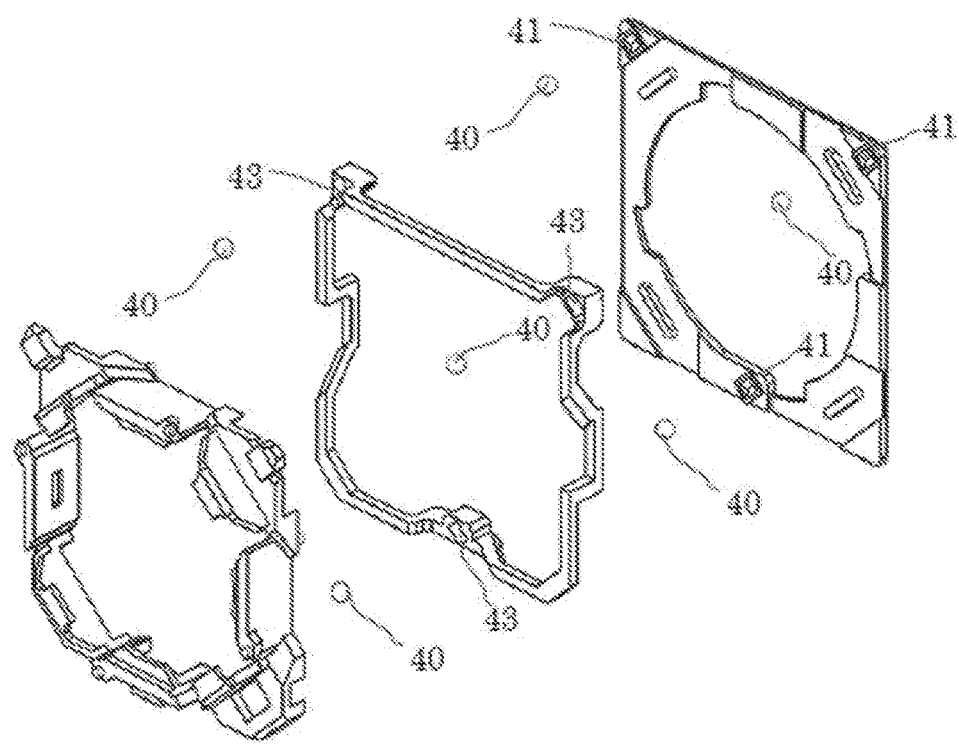
FIG. 6 is an exploded view 2 illustrating a fixing base and a supporting component according to an embodiment of the present disclosure.
Figure 7:
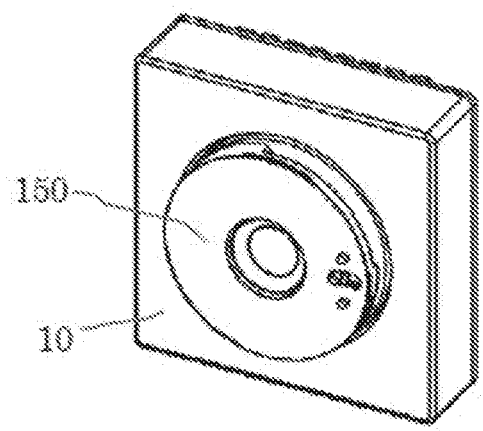
FIG. 7 is a side view illustrating a lens driving device including a blade driving device combined on an upper surface of a lens module according to an embodiment of the present disclosure.

10: housing;
11: connection-line fixing base;
12: cover;
13: fixing base;
14: receiving space;
15: connection terminal disposed on the connection line fixing base and connected with the outside;
20: first supporting frame;
21: second supporting frame;
30: lens module;
31: protrusion;
32: gravity center of the lens module;
40: supporting component;
41: groove disposed on the fixing base to limit a direction of the supporting component;
42: groove disposed on the first supporting frame to limit a direction of the supporting component;
43: groove disposed on the second supporting frame to limit the supporting component;
44: limited first axis direction;
45: limited second axis direction;
50: spring piece;
51: upper spring piece;
52: lower spring piece;
53: spring tongue cover;
60: first magnet;
61: magnet corresponding to a magnetic detecting element;
62: second magnet;
70: first drive coil;
71: second drive coil;
72: second drive coil accessory;
80: connection line;
81: magnetic detecting element having a first drive circuit;
82: magnetic detecting element having a second drive circuit;
90: magnetic yoke;
100: lens driving device;
150: blade driving device;
200: portable information device;
300: photographing device.

DETAILED DESCRIPTION OF THE EMBODIMENTS

The present disclosure will be described in detail below with reference to the accompanying drawings.

FIG. 1 to FIG. 4 are drawings illustrating a lens driving device 100 of the present disclosure.

The lens driving device 100 includes a housing 10, a lens module 30, a first supporting frame 20, a spring piece 50, a supporting component 40, a first magnet steel 60, a first drive coil 70, a second magnet steel 62 and a second drive coil 71.

The housing 10 has a receiving space 14. The housing 10 includes a fixing base 13, a cover 12 for forming the receiving space 14 in cooperation with the fixing base 13, and a connection line fixing base 11 for fixing a connection line 80.

The fixing base 13 has a groove 41 disposed on the fixing base 13 to limit a direction of the supporting component 40, and the second drive coil 71 fixed on the fixing base 13.

The first supporting frame 20 has a groove 42 disposed on the first supporting frame 20 to limit the direction of the supporting component 40. The first supporting frame 20 is received within the receiving space 14 of the housing 10. The lens module 30 is received within the supporting frames 20, and includes a lens (not shown). A second supporting frame 21 has a groove 43 of the supporting component that is disposed on the second supporting frame 21 to limit the direction of the supporting component 40, and the second supporting frame 21 is also received within the receiving space 14 of the housing 10.

The supporting component 40 supports the first supporting frame 20 and the fixing base 13 in a manner of enabling the first supporting frame 20 and the second supporting frame 21 to move freely relative to the fixing base 13 along the direction orthogonal to the optical axis of the lens.

The supporting component 40 may be a ball. At least 6 balls are disposed as the supporting components 40. Moving axes are limited by the groove 41, the groove 42 and the groove 43 disposed on the fixing base, the first supporting frame 20, and the second supporting frame 21 respectively. The groove 41 is disposed on the fixing base 13 to limit the direction of the supporting component 40, the groove 42 is disposed on the first supporting frame 20 to limit the direction of the supporting component 40, and the groove 43 is disposed on the second supporting frame 21 to limit the direction of the supporting component 40. By rolling the balls 40, the first supporting frame 20 and the second supporting frame 21 can be moved freely in a limited first axis direction 44 and a limited second axis direction 45 and along the direction orthogonal to the optical axis of the lens relative to the fixing base 13.

In addition, the fixing base 13, three supporting components 40, the second supporting frame 21, three supporting components 40 and the first supporting frame 20 are assembled in a sequence relative to the optical axis direction, so that these components are adsorbed in the optical axis direction to ensure no deviation of any direction under the magnetic actions of a magnetic yoke 90 disposed on the fixing base 13 and the second magnet steel 62 disposed on the first supporting frame 20.

In addition, in another preferred example, the efficiency of the electromagnetic action can be improved by disposing a second drive coil accessory 72 on the connection line fixing base 11.

The spring piece 50 is used to connect the lens module 30 and the supporting frame 20.

The spring piece 50 includes an upper spring piece 51 and a lower spring piece 52 which are disposed on an upper surface and a lower surface of the lens module 30 along the optical axis direction of the lens respectively. A spring tongue cover 53 is disposed on the spring piece 50.

The first magnet steel 60 and the second magnet steel 62 are mounted and fixed on the first supporting frame 20.

The lens driving device 100 is provided with a magnetic yoke 90. The magnetic yoke 90 is fixedly mounted on the fixing base 13, and has the effects of pulling the second magnet steel 62 in the optical axis direction and pulling the lens module toward the center of the optical axis when the lens module moves in a direction vertical to the optical axis direction.

The first drive coil 70 is fixedly mounted on the lens module 30, and disposed opposite to the first magnet steel 60.

A protrusion 31 extending in a direction away from the center of the lens module 30 is disposed on the lens module 30. The first drive coil 70 is held on the protrusion 31. The first drive coil 70 is disposed opposite to the first magnet steel 60. The lens module 30 can be moved along the optical axis direction of the lens under the electromagnetic action between the first drive coil 70 and the first magnet steel 60, thereby achieving focusing.

The second drive coils 71 are disposed on the fixing bases 13, and correspondingly disposed above the second magnet steel 62, respectively.

The second drive coil 71 may be a coil winding fixedly mounted on the fixing base 13, or may be a conductive pattern directly formed on the fixing base 13. The first supporting frame 20 can be moved relative to the fixing base 13 along the direction orthogonal to the optical axis of the lens under the electromagnetic action between the second drive coil 71 and the second magnet steel 62, thereby realizing the adjustment relating to the movement of the optical axis of the lens.

In an example, four first drive coils 70 may also be disposed. Of course, disposal of four first drive coils 70 is only a preferred implementation which is used to help those skilled in the art to fully understand the present disclosure and thus the four drive coils are not intended to limit the present disclosure recorded in the claims.

Corresponding to the first drive coils 70, the upper spring piece 51 and the four first drive coils 70 are configured symmetrically relative to the center of the optical axis of the lens, that is, configured symmetrically relative to the optical axis.

A connection line 80 is also disposed in the lens driving device 100.

The connection line 80 is connected with the spring piece 50. A wire end at one end of each first drive coil 70 is connected with a corresponding upper spring piece 51, and a wire end at the other end is connected with the lower spring piece 52. Alternatively, a magnetic detecting element 81 having the first drive circuit may also be connected with the wire end of each first drive coil 70, and connected with the spring piece 50, so that the magnetic detecting element 81 is connected with the connection line 80 through the spring piece 50. In addition, the spring piece 50 may also be used as a path for energizing a blade driving device 150 configured on the lens module 30. The magnetic detecting element 81 having the first drive circuit is merely an example, and therefore the magnetic detecting element may also be a drive IC serving for magnetic detection concurrently. The magnetic detecting element 81 having the first drive circuit detects the magnetism of the magnet steel 61 corresponding to the magnetic detecting element. In this way, the location of the lens module 30 moving along the optical axis direction is detected, thereby more effectively performing adjustment relating to the movement of the optical axis of the lens.

Similarly, corresponding to the first drive coil 70, four first magnet steels 60 and four second drive coils 71 are disposed. The first magnet steel 60 and the four second drive coils 71 are configured symmetrically relative to the center of the optical axis of the lens respectively, that is, configured symmetrically relative to a central line.

The second drive coil 71 and the second drive coil accessory 72 are electrically connected with a connection terminal 15 that is disposed on the connection-line fixing base and connected with the outside, but the second drive coil 71 and the second drive coil accessory 72 may also be connected with a magnetic detecting element 82 having a second drive circuit. The magnetic detecting element 82 having the second drive circuit is merely an example, and therefore the magnetic detecting element 82 may also be a drive IC serving for magnetic detection concurrently. The magnetic detecting element 82 having the second drive circuit is located opposite to the second magnet 62, and can detect the location of the second magnet 62 moving together with the first supporting frame 20.

In a case that the optical axis of the lens moves due to the jitter or tends to move, a current may flow into the second drive coil 71 and the second drive coil accessory 72 which are disposed near the horizontal plane of the gravity center 32 of the lens module. Since the second drive coil 71 and the second drive coil accessory 72 are fixed, the first supporting frame 20 can be efficiently balanced relative to a gravity center of a moving object based on the principle of an acting force and counter-acting force, and moves relative to the fixing base 13 along the direction orthogonal to the optical axis of the lens. Optionally, the current may flow into the first drive coil 70. Since four opposite first magnet steels 60 are fixed, the lens module can suppress a moving tendency of the optical axis of the first supporting frame 20 based on the principle of the acting force and counter-acting force and can focus arbitrarily. Therefore, the movement of the optical axis of the lens can be adjusted.

Figure 8:
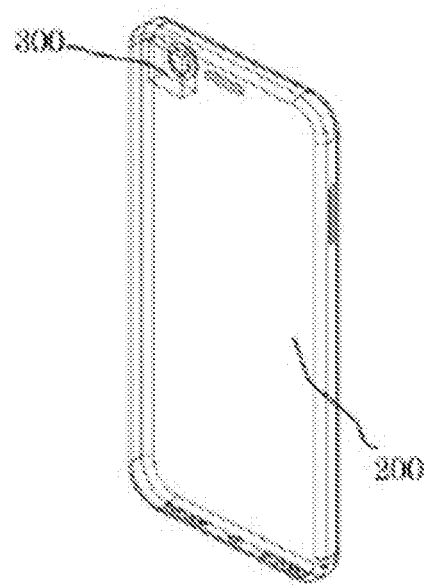
FIG. 8 illustrates a portable electronic device (a portable information terminal) having a lens driving device of the present disclosure.

The above lens driving device 100 may be applied to a photographing device 300 used for a portable information device 200, such as a smart phone, a feature phone, or a tablet device as shown in FIG. 8.

The movement of the optical axis of the lens can be adjusted by using the lens driving device 100 of the present disclosure, thereby preventing the jitter and improving the quality of the photographed image.

The above descriptions are merely preferred examples of the present disclosure, and the scope of protection of the present disclosure is not limited to the above examples. Equivalent modifications or variations made by those skilled in the art based on contents of the present disclosure should all fall in the present disclosure recorded in the claims of the present disclosure.

What is claimed is:
1. A lens driving device, comprising:
   a housing having a receiving space, the housing comprises a cover and a fixing base fixed to the cover, and the receiving space contains:
   a lens module,
   a spring piece,
   a supporting frame and a first electromagnetic driving device, which are used for driving the lens module to move freely along an optical axis direction; and
   a supporting component and a second electromagnetic driving device which are used for driving the supporting frame to move freely relative to the fixing base along a direction orthogonal to the optical axis direction;
   the supporting frame is formed by two components defined as a first supporting frame and a second supporting frame, the first supporting frame and the second supporting frame have different moving axes within a plane so as to move relative to the fixing base;

wherein the second electromagnetic driving device comprises a second drive coil and a second magnet, the second drive coil is disposed on the fixing base and the second magnet is disposed on the first supporting frame, and the second drive coil is disposed near a horizontal plane of a gravity center of the lens module, and a first portion of the supporting component is provided directly between the fixing base and the second supporting frame and a second distinct portion of the supporting component is provided directly between the second supporting frame and the first supporting frame, the fixing base, the second supporting frame and the first supporting frame are all directly in contact with at least one portion of the supporting component.

2. The lens driving device according to claim 1, wherein the supporting component is a ball, and at least 6 balls are disposed.

3. The lens driving device according to claim 2, wherein each of the two supporting frames has a groove for driving the supporting frame to move along a different moving axis within the plane.

4. The lens driving device according to claim 2, wherein the first electromagnetic driving device utilize an electromagnetic action generated by a magnet steel and a coil.

5. The lens driving device according to claim 4, wherein the spring piece is conductively connected to a magnetic detecting element disposed opposite to an inner surface of the magnet steel.

6. The lens driving device according to claim 5, wherein the spring piece is conductively connected to a blade driving device combined on an upper surface of the lens module.

7. The lens driving device according to claim 2, wherein the second drive coil is set between the cover and the second magnet along the direction parallel to the optical axis.

8. The lens driving device according to claim 1, wherein each of the two supporting frames has a groove for driving the supporting frame to move along a different moving axis within the plane.

9. The lens driving device according to claim 1, wherein the first electromagnetic driving device utilize an electromagnetic action generated by a magnet steel and a coil.

10. The lens driving device according to claim 9, wherein the spring piece is conductively connected to a magnetic detecting element disposed opposite to an inner surface of the magnet steel.

11. The lens driving device according to claim 10, wherein the spring piece is conductively connected to a blade driving device combined on an upper surface of the lens module.

12. The lens driving device according to claim 1, wherein the second drive coil is set between the cover and the second magnet along the direction parallel to the optical axis.

13. A camera, having the lens driving device according to claim 1.

14. A portable electronic device, having the camera according to claim 13.

* * * * *